(12) United States Patent
Kim

(10) Patent No.: US 11,204,461 B2
(45) Date of Patent: Dec. 21, 2021

(54) LIGHT GUIDE PLATE DESK LAMP

(71) Applicant: Min Ji Kim, Seoul (KR)

(72) Inventor: Min Ji Kim, Seoul (KR)

( * ) Notice: Subject to any disclaimer, the term of this patent is extended or adjusted under 35 U.S.C. 154(b) by 0 days.

(21) Appl. No.: 16/865,078

(22) Filed: May 1, 2020

(65) Prior Publication Data

US 2020/0257038 A1 Aug. 13, 2020

Related U.S. Application Data

(63) Continuation of application No. PCT/KR2017/012851, filed on Nov. 14, 2017.

(30) Foreign Application Priority Data

Nov. 13, 2017 (KR) .......................... 10-2017-0150824

(51) Int. Cl.
| | |
|---|---|
| *G02B 6/00* | (2006.01) |
| *F21V 8/00* | (2006.01) |
| *F21S 6/00* | (2006.01) |
| *F21V 23/00* | (2015.01) |
| *F21V 23/04* | (2006.01) |
| *F21Y 115/10* | (2016.01) |

(52) U.S. Cl.
CPC ............ *G02B 6/0088* (2013.01); *F21S 6/003* (2013.01); *F21V 23/007* (2013.01); *F21V 23/0471* (2013.01); *G02B 6/0073* (2013.01); *F21Y 2115/10* (2016.08)

(58) Field of Classification Search
CPC ... G02B 6/0088; G02B 6/0073; F21V 23/007; F21V 23/0471; F21S 6/003
See application file for complete search history.

(56) References Cited

U.S. PATENT DOCUMENTS

| | | | | |
|---|---|---|---|---|
| 5,511,647 | A * | 4/1996 | Adrian | .................... B66B 31/00 |
| | | | | 198/335 |
| 8,833,996 | B2 * | 9/2014 | Dau | ......................... H01L 33/58 |
| | | | | 362/558 |
| 2003/0169383 | A1 * | 9/2003 | Kim | ...................... G02B 6/009 |
| | | | | 349/58 |
| 2017/0322367 | A1 * | 11/2017 | Wang | .................... F21S 43/195 |
| 2018/0203180 | A1 * | 7/2018 | Horner | ...................... F21V 9/08 |
| 2018/0220508 | A1 * | 8/2018 | Pilat | ....................... H05B 45/20 |
| 2018/0279448 | A1 * | 9/2018 | Page | ...................... H05B 47/11 |
| 2018/0292603 | A1 * | 10/2018 | Yu | ........................ G02B 6/0091 |
| 2020/0257039 | A1 * | 8/2020 | Du | ....................... G02B 6/0088 |

FOREIGN PATENT DOCUMENTS

| | | |
|---|---|---|
| KR | 10-2009-0133102 | 12/2011 |
| KR | 20150059685 A * | 6/2015 |
| KR | 10-2013-0143082 | 7/2015 |
| KR | 10-2014-0091875 | 6/2016 |

* cited by examiner

*Primary Examiner* — Gerald J Sufleta, II
(74) *Attorney, Agent, or Firm* — Avant Law Group, LLC

(57) ABSTRACT

A light guide plate supported by at least one frame. An LED module is arranged on at least one side of the light guide plate, and a power input module is supported by at least one frame. When power is applied by the power input module, LED elements of the LED module emit light, and light emitted by the LED module is emitted through the light guide plate.

8 Claims, 6 Drawing Sheets

LIGHT GUIDE PLATE DESK LAMP

CROSS REFERENCE TO RELATED APPLICATIONS

The application is a continuation of International Patent Application, Serial No. PCT/KR2017/012851 filed Nov. 14, 2017, which claims priority to Korean Patent Application, Serial No. 10-2017-0150824, filed Nov. 13, 2017. The disclosure of each is incorporated by reference herein in its entirety.

TECHNICAL FIELD

The present disclosure relates to the field of desk lamp lighting. More specifically, the present disclosure relates to a desk lamp capable of suppressing glare by including a light guide plate.

BACKGROUND ART

With the development of mobile terminals such as smartphones, tablet PCs and the like, modern users have a lot of opportunities to access audio-visual media. In other words, as modern users are often placed in a situation where they have to watch something through their eyes, importance of vision is paramount.

Particularly, when a student studying at a desk or a worker working in an office continuously studies or works in a dark environment, eyesight is adversely affected. Therefore, a lamp (a table lamp or a desk lamp) is often placed on a desk to prevent adverse effect to the reader's eyes.

However, desk lamps so far only serve to emit light on the desk and do not present a useful solution to the glare of a user, shading or the like caused by the emitted light.

SUMMARY

It is an object of the present disclosure to provide a light guide plate desk lamp, which may prevent glare and generation of shadows by light. Another object of the present disclosure is to provide a light guide plate desk lamp, which can sense an operation mode or a user's motion and emit custom-tailored light in response.

According to one aspect of the present disclosure, there is provided a light guide plate desk lamp comprising: a light guide plate supported by at least one frame; an LED module arranged at least on one side of the light guide plate; and a power input module supported by the at least one frame, wherein an LED element of the LED module may emit light as power is applied to the power input module, and the light emitted from the LED module may be emitted through the light guide plate.

A fixing member for attaching the light guide plate desk lamp may be formed in the at least one frame.

The light guide plate desk lamp may further comprise a control panel for controlling operation of the light guide plate desk lamp.

The at least one frame may have a sliding groove for sliding coupling of the light guide plate, and the power input module may be coupled through the sliding groove and supported by the at least one frame.

The at least one frame may include: a first frame and a second frame arranged along a length direction of the light guide plate; and a third frame and a fourth frame arranged along width direction of the light guide plate, wherein the light guide plate may be supported by the first frame, the second frame and the third frame, and the power input module may be supported by the first frame, the second frame and the fourth frame.

The LED module may include a plurality of LED elements, and the power input module may further include a controller for controlling at least one among on/off and color temperature of each of the LED elements according to an operation mode selected by a user input received through the control panel.

The light guide plate desk lamp may further comprise a sensing sensor for sensing at least one among a user and text, wherein the controller may control at least one among on/off and color temperature of each of the LED elements on the basis of a sensing result of the sensing sensor.

The light guide plate desk lamp according to an embodiment of the present disclosure may prevent glare and generation of shadows by light.

In addition, the light guide plate desk lamp according to an embodiment of the present disclosure may sense an operation mode or a user's motion and emit custom-tailored light.

However, the effect that the light guide plate desk lamp according to an embodiment of the present disclosure can achieve is not limited to those mentioned above, and other effects not mentioned can be clearly understood by those skilled in the art from the following description.

BRIEF DESCRIPTION OF THE DRAWINGS

To more sufficiently understand the drawings cited in this specification, a brief description of each drawing will be provided.

DETAILED DESCRIPTION

Figure 1:
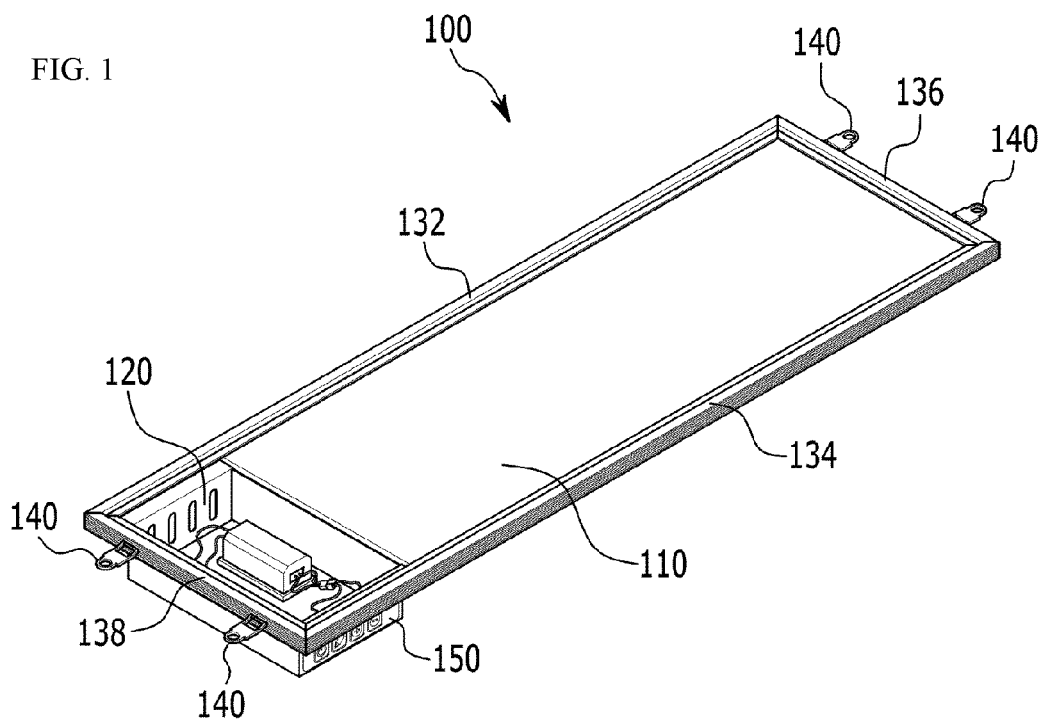
FIG. 1 is a view showing the top surface of a light guide plate desk lamp according to an embodiment of the present disclosure.

Since the present disclosure may be diversely modified and have various embodiments, specific embodiments will be shown in the drawings and described in detail in the detailed description. However, it should be understood that this is not intended to limit the present disclosure to the specific embodiments, but to comprise all modifications, equivalents and substitutions included in the spirit and scope of the present disclosure.

In describing the present disclosure, if it is determined that the detailed description on the related known art may obscure the gist of the present disclosure, the detailed description will be omitted. In addition, the numerals (e.g., first, second, etc.) used in the description process of this specification are merely identification symbols for distinguishing one component from the other components.

In addition, it will be understood that when a component is referred to as being "connected" or "coupled" to another component in this specification, the component may be directly connected or coupled to another component or may be connected with intervention of still another component as far as an opposed description is not specifically provided.

In addition, in this specification, a component expressed as '~ part (unit)' or 'module' may be two or more components combined into one component, or may be one component divided into two or more detailed functions. In addition, each of the components to be described below may additionally perform some or all of the functions of other components in addition to the main function of the component itself described below, and part of the main function of each component may be carried out exclusively by another component.

Hereinafter, embodiments according to the spirit of the present disclosure will be described one by one in detail.

Figure 2:
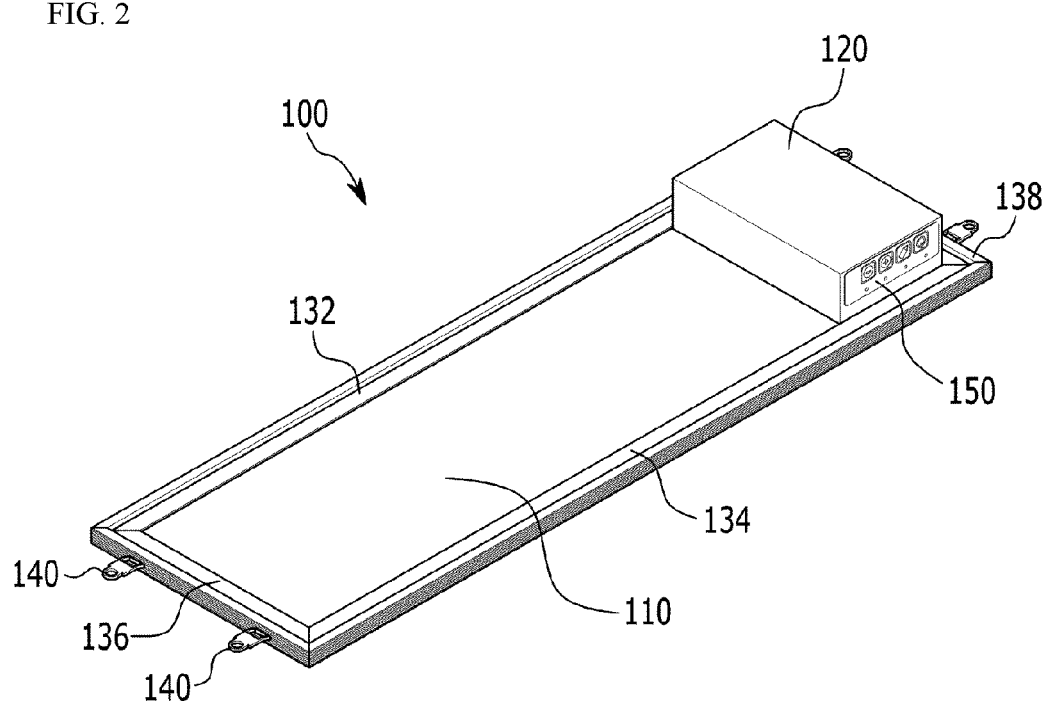
FIG. 2 is a view showing the bottom surface of a light guide plate desk lamp according to an embodiment of the present disclosure.

FIG. 1 is a view showing the top surface of a light guide plate desk lamp 100 according to an embodiment of the present disclosure, and FIG. 2 is a view showing the bottom surface of a light guide plate desk lamp 100 according to an embodiment of the present disclosure.

Referring to FIGS. 1 and 2, the light guide plate desk lamp 100 according to an embodiment of the present disclosure includes a light guide plate 110 supported by at least one frame, an LED module 160 arranged at least on one side of the light guide plate 110 (see FIG. 6), and a power input module 120 supported by the at least one frame.

The light guide plate 110 guides light emitted from the LED module 160 to emit light through the bottom surface of the light guide plate 110. Since the light guide plate 110 changes the line light source of the LED module 160 to a surface light source, glare of a user may be suppressed.

The power input module 120 receives power from an external power supply (e.g., a power outlet) or a built-in battery and applies the power to the LED module 160. As the power input module 120 applies power to the LED module 160, the LED elements 162 of the LED module 160 may emit light.

The power input module 120 may be configured of a PCB circuit and a wire for receiving and applying power to the LED module 160, and a power supply frame 125 for accommodating the circuit and the wire.

The at least one frame may include a first frame 132 and a second frame 134 arranged along the length direction of the light guide plate 110, and a third frame 136 and a fourth frame 138 arranged along the width direction of the light guide plate 110.

The first frame 132, the second frame 134, the third frame 136 and the fourth frame 138 may be fixedly coupled to each other after being combined with the light guide plate 110 and the power input module 120 (specifically, the power supply frame 125) while being physically separated from each other, or at least two or more frames among the first frame 132, the second frame 134, the third frame 136, and the fourth frame 138 may be formed in one piece.

As shown in FIGS. 1 and 2, the light guide plate 110 is supported by the first frame 132, the second frame 134 and the third frame 136, and the power input module 120 may be supported by the first frame 132, the second frame 134 and the fourth frame 138.

A method of combining the light guide plate 110 and the power input module 120 with the frames 132, 134, 136 and 138 will be described below with reference to FIGS. 3 to 5.

Referring to FIG. 1, at least some of the first frame 132, the second frame 134, the third frame 136 and the fourth frame 138 may have fixing members 140 formed to attach the light guide plate desk lamp 100. Although FIG. 1 shows that the fixing members 140 are connected to the third frame 136 and the fourth frame 138, this is only an embodiment, and the fixing members 140 may also be connected to the first frame 132 or the second frame 134.

The light guide plate desk lamp 100 may be installed by screwing the fixing members 140 of the light guide plate desk lamp 100 to a desk (see FIG. 10) or the like. However, the installation method of the light guide plate desk lamp 100 is not limited thereto, and a leg and a base may be connected to the light guide plate desk lamp 100 to stand the desk lamp on a desk.

Referring to FIGS. 1 and 2, the light guide plate desk lamp 100 may further include a control panel 150. The control panel 150 is for receiving a user's handling input, and the user may set on/off, operation mode or the like of the light guide plate desk lamp 100 through the control panel 150. Although FIGS. 1 and 2 show that the control panel 150 is attached on a side of the power input module 120, this is only an example, and the control panel 150 may be installed at various locations of the light guide plate desk lamp 100.

Figure 3:
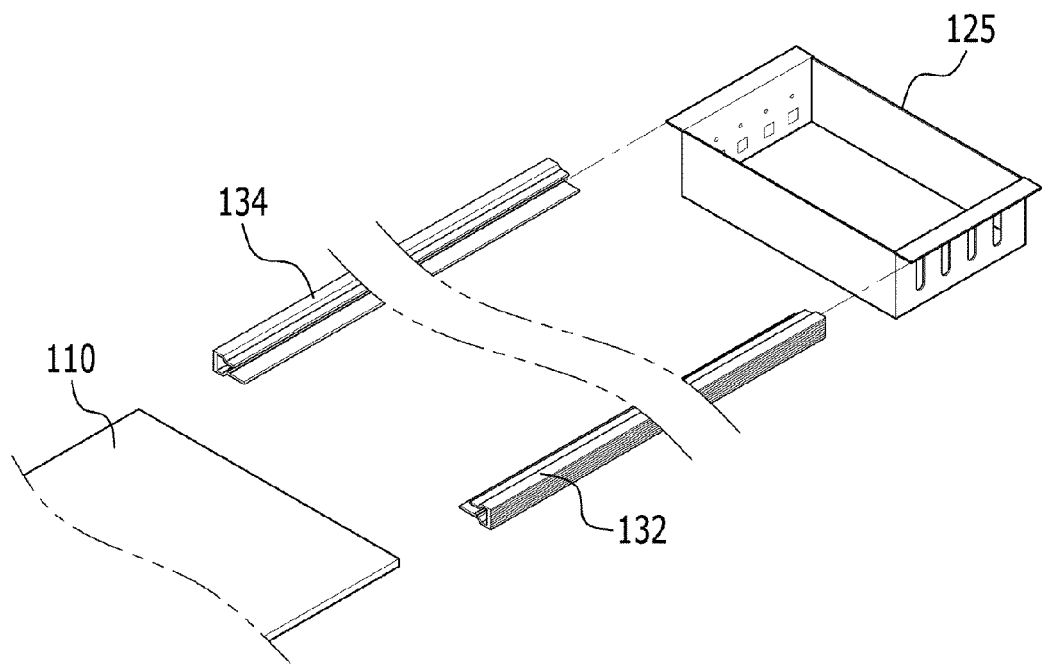
FIG. 3 is a view showing a method of combining a light guide plate and a power supply frame with a first frame and a second frame.
Figure 4:
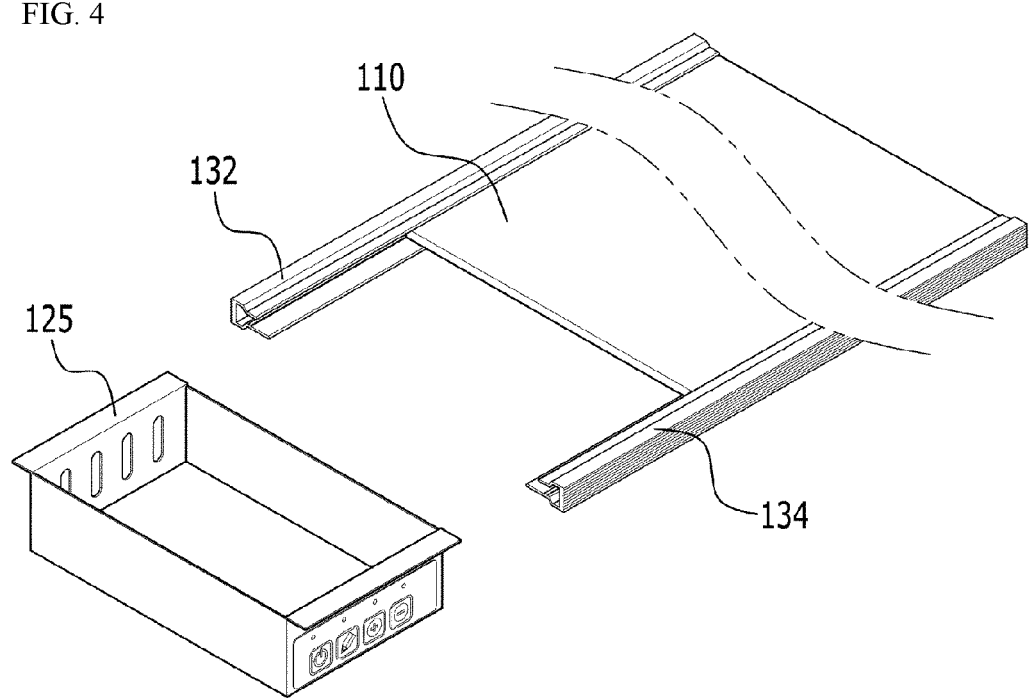
FIG. 4 is a view showing a method of combining a light guide plate and a power supply frame with a first frame and a second frame.
Figure 5:
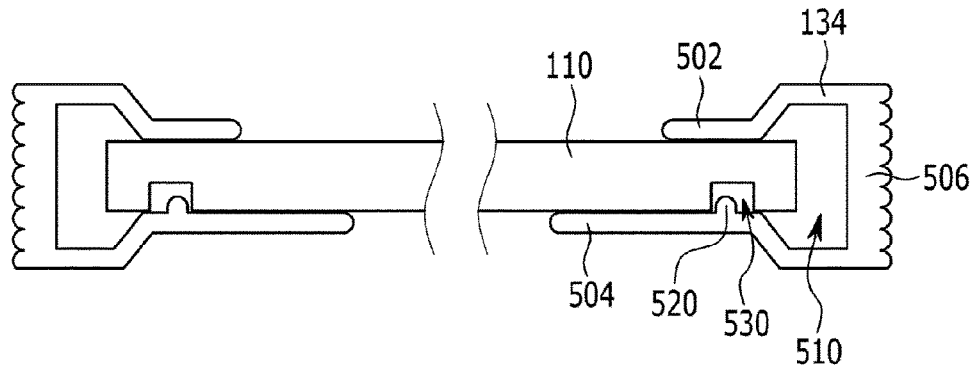
FIG. 5 is an enlarged view showing a combined structure of the light guide plate and the second frame.

FIGS. 3 and 4 are views for describing the method of combining the light guide plate 110 and the power supply frame 125 with the first frame 132 and the second frame 134, and FIG. 5 is an enlarged view showing a combined structure of the light guide plate 110 and the second frame 134.

As shown in FIG. 5, the second frame 134 (and the first frame 132) is configured of a top surface 502, a bottom surface 504, and a connection surface 506 for connecting the top surface 502 and the bottom surface 504, and the inner space of the top surface 502, the bottom surface 504 and the connection surface 506 functions as a sliding groove 510 for sliding coupling with the light guide plate 110 and the power supply frame 125. Through the sliding groove 510, the light guide plate 110 and the power supply frame 125 may be slidably coupled to the first frame 132 and the second frame 134.

In addition, coupling protrusions 520 may be formed on the first frame 132 and the second frame 134 for smooth sliding coupling, and coupling grooves 530 corresponding to the coupling protrusions 520 may be formed on the bottom surface of the light guide plate 110.

As shown in FIGS. 3 and 4, the light guide plate 110 may be slidably coupled in one direction of the first frame 132 and the second frame 134, and the power supply frame 125 may be slidably coupled in the other direction of the first frame 132 and the second frame 134, and then, the third frame 136 and the fourth frame 138 may be coupled to the first frame 132 and the second frame 134.

Figure 6:
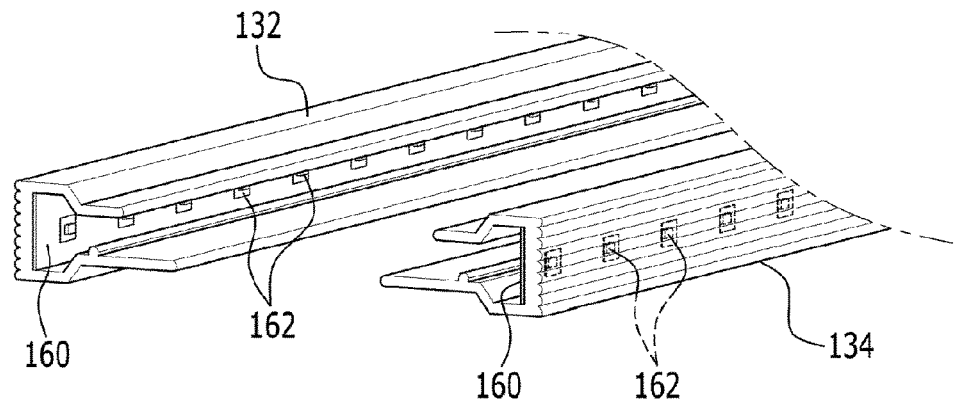
FIG. 6 is a view showing LED modules located on the inner side of the first frame and the second frame.

FIG. 6 is a view showing LED modules 160 located on the inner side of the first frame 132 and the second frame 134.

As described above, the LED elements 162 of the LED module 160 are arranged at least on one side of the light guide plate 110 and emit light from the side surface of the light guide plate 110. As shown in FIG. 6, the LED module 160 may be located on the inner side of the first frame 132 and the second frame 134. However, according to embodiments, the LED module 160 may be located only on the inner side of one of the first frame 132 and the second frame 134. The LED module 160 is connected to the power input module 120 through a wire and receives power supplied from the power input module 120, and accordingly, the LED elements 162 emit light.

Figure 7:
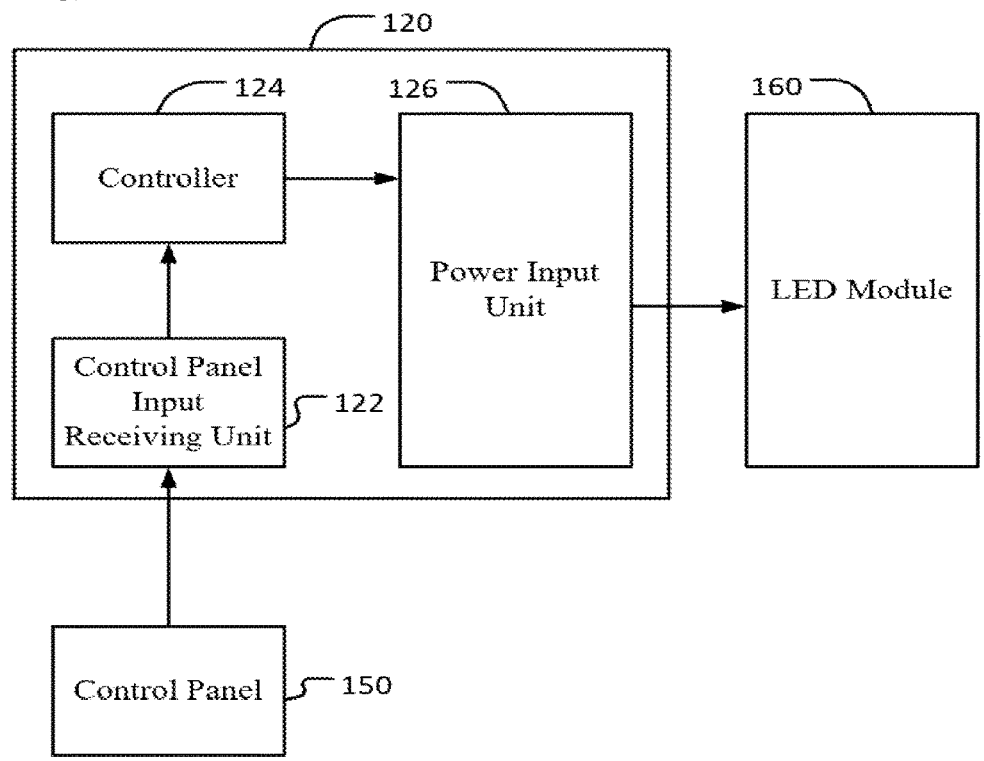
FIG. 7 is a functional block diagram showing the functions of a power input module according to an embodiment of the present disclosure.

FIG. 7 is a functional block diagram showing the functions of the power input module 120 according to an embodiment of the present disclosure.

Referring to FIG. 7, the power input module 120 may include a control panel input receiving unit 122, a controller 124, and a power input unit 126.

The control panel 150 receives user's handling input and transmits information on the user's handling to the control panel input receiving unit 122. The control panel input receiving unit 122 transfers the information on the user's handling on the control panel 150 to the controller 124, and the controller 124 controls the power input unit 126 to control on/off of the LED elements 162 included in the LED module 160.

For example, when a turn-on input of the light guide plate desk lamp 100 is applied through the control panel 150, the controller 124 applies power to the LED module 160 through the power input unit 126 so that the LED elements 162 of the LED module 160 may emit light, and when a turn-off input is applied through the control panel 150, the controller 124 cuts off the power applied to the LED module 160 to stop emission of light of the LED elements 162.

According to an embodiment of the present disclosure, a user may set an operation mode of the light guide plate desk lamp 100, as well as on/off control of the light guide plate desk lamp 100. For example, the operation mode may include at least one among a mathematics section mode, a language section mode, an art and sport section mode, a creativity section mode, and a rest mode. The user may set the operation mode of the light guide plate desk lamp 100 to the mathematics section mode, the language section mode, the art and sport section mode, the creativity section mode, or the rest mode by handling the control panel 150.

According to setting of the operation mode, the controller 124 may control at least one among on/off and color temperature of each of the LED elements 162.

For example, when the operation mode is set to the mathematics section mode, the controller 124 may adjust the color temperature of the LED elements 162 to 7300 to 8000 Kelvin, and when the operation mode is set to the language section mode, the controller 124 may adjust the color temperature to 4200 to 4600 Kelvin. In addition, when the operation mode is set to the art and sport section mode, the controller 124 may adjust the color temperature to 2200 to 2700 Kelvin, and when the operation mode is set to the rest mode, the controller 124 may adjust light emission of the LED elements 162 to a color temperature set according thereto.

As it is apparent that a user may be psychologically and physically affected by the light color of the LED elements 162 that is changed according to the color temperature of light, in an embodiment of the present disclosure, the color temperature of the LED elements 162 may be adjusted according to the operation mode set by the user considering the effect on the user influenced according to the color temperature of light.

As another example, the controller 124 may select LED elements 162 that should emit light and LED elements 162 that should not emit light among the plurality of LED elements 162 according to the operation mode, and accordingly, only the LED elements 162 that need to emit light among the plurality of LED elements 162 may be controlled to emit light through the power input module 120.

In addition, the control panel 150 may include a color temperature control button, and although the light guide plate desk lamp 100 operates according to a specific operation mode, the user may increase or decrease the color temperature of the LED elements 162 through the color temperature control button.

Figure 8:
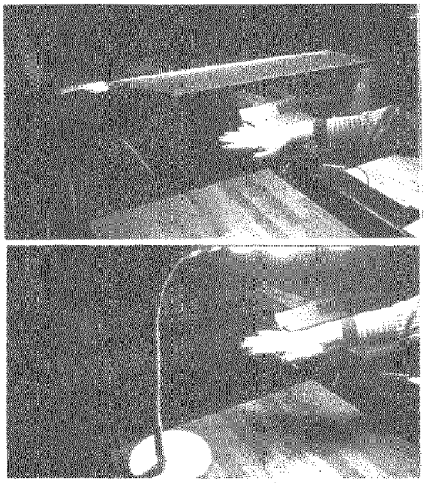
FIG. 8 is a view comparing the effects of suppressing generation of shadows of a general desk lamp and a light guide plate desk lamp according to an embodiment of the present disclosure.

FIG. 8 is a view comparing the effects of suppressing generation of shadows of a general desk lamp and a light guide plate desk lamp 100 according to an embodiment of the present disclosure.

As described above, it is understood that a shadow of a user's hand appears on the desk in the case of a general desk lamp (the photo on the lower side), whereas in the light guide plate desk lamp 100 according to an embodiment of the present disclosure (the photo on the upper side), a shadow of the hand does not appear on the desk.

Figure 9:
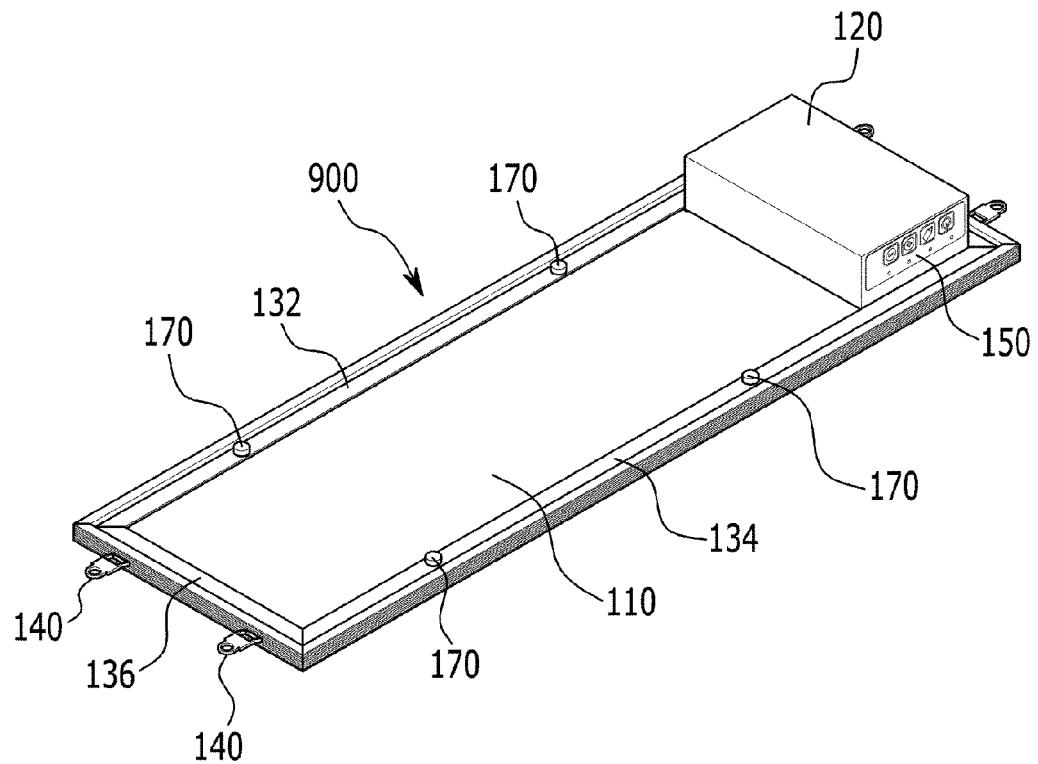
FIG. 9 is a view showing the bottom surface of a light guide plate desk lamp according to another embodiment of the present disclosure.

FIG. 9 is a view showing the bottom surface of a light guide plate desk lamp 900 according to another embodiment of the present disclosure.

Although the configuration of the light guide plate desk lamp 900 shown in FIG. 9 is the same as the configuration of the light guide plate desk lamp 100 shown in FIGS. 1 and 2, additionally, at least one sensing sensor 170 may be further placed.

The at least one sensing sensor 170 senses a user sitting at the desk, and the controller 124 controls the light emission mode of the LED elements 162 according to a sensing result.

Figure 10:
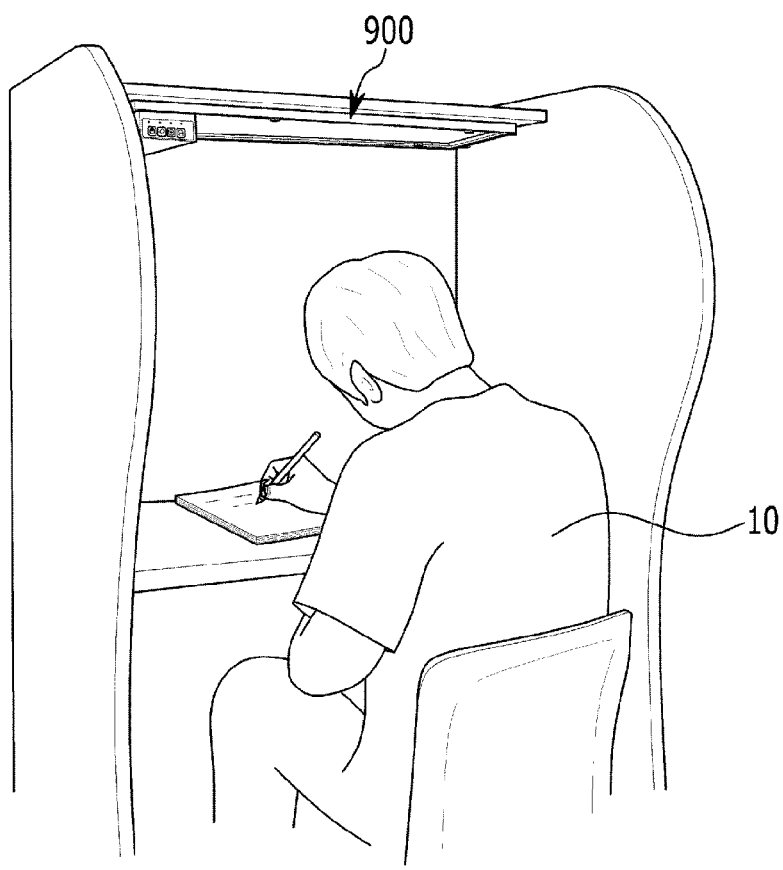
FIGS. 10 and 11 are views showing a light guide plate desk lamp which senses movement of a user positioned at a desk and changes a light emission mode.
Figure 11:
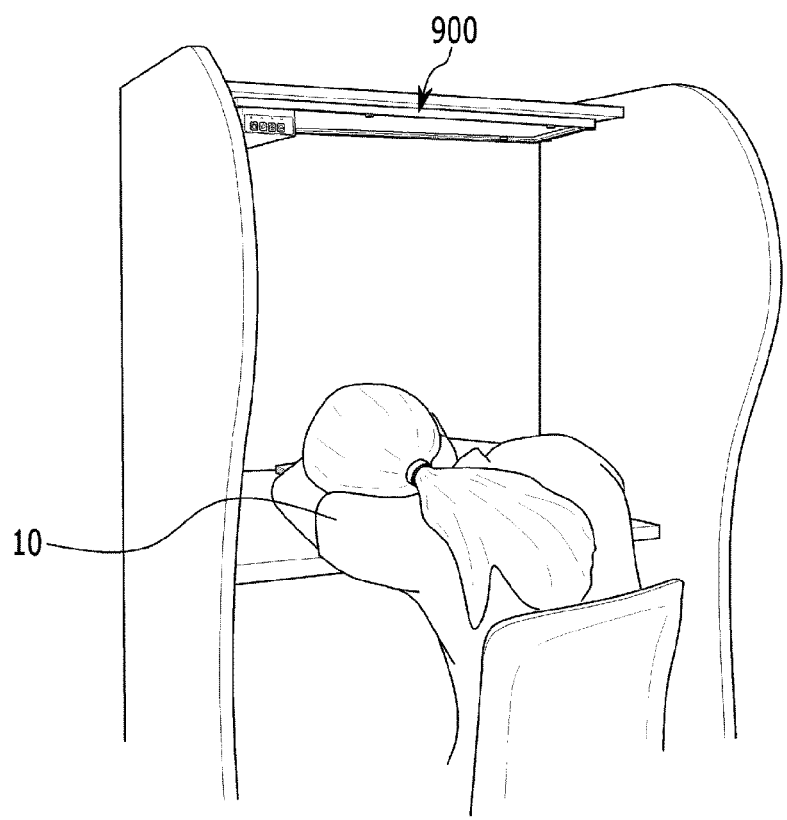

For example, as shown in FIG. 10, the sensing sensor 170 senses the distance from the sensing sensor 170 to the head of the user 10, and when the controller 124 determines on the basis of the sensed distance that the user is working with his head raised, the LED elements 162 may emit light according to the operation mode set by the user 10. However, as shown in FIG. 11, when it is sensed on the basis of the distance from the sensing sensor 170 to the head of the user 10 that the user 10 is bowing on the desk surface, it is determined that the user is sleeping, and thus all the LED elements 162 may be turned off, or the color temperature of the LED elements 162 may be lowered to emit dark light.

In addition, according to embodiments, if the time period of the user leaving the desk exceeds a preset time period (e.g., 10 minutes), the controller 124 may switch to a power saving mode and turn off all the LED elements 162.

According to another embodiment, the sensing sensor 170 may sense text of a document placed on the desk by the user through a camera module, and the controller 124 may analyze the text recognized by the sensing sensor 170 and determine the section the user studies. For example, it may be determined through text analysis whether the user is studying a mathematics section, a language section, or an art and sport section. The controller 124 may automatically change the operation mode according to the determination result so that custom-tailored light may be emitted without separate handling of the user. In other words, if it is determined that the user is studying the mathematics section, the controller 124 may adjust the color temperature of the LED elements 162 to 7300 to 8000 Kelvin, and if it is determined that the user is studying the language section, the controller 124 may adjust the color temperature of the LED elements 162 to 4200 to 4600 Kelvin.

As described above, although the technical spirit of the present disclosure has been described in detail with reference to the preferred embodiments, the technical spirit of the present disclosure is not limited to the above embodiments, and various modifications and changes can be made by those skilled in the art.

The invention claimed is:

1. A light guide plate desk lamp comprising:
    a light guide plate supported by at least one frame, the light guide plate having a slot;
    an LED module arranged at least on one side of the light guide plate;
    a sensor configured to detect text;
    a controller; and
    a power input module supported by the at least one frame;
    wherein;
        the at least one frame has a sliding groove for slidably coupling both the light guide plate and the power input module, the sliding groove having a protrusion configured to fit within the slot;
        the controller determines a topic of the text in response to a sensor detection; and
        an LED element of the LED module emits light as power is applied to the power input module, and the light emitted from the LED module is emitted through the light guide plate.

2. The desk lamp according to claim 1, wherein a fixing member for attaching the light guide plate desk lamp is formed in the at least one frame.

3. The desk lamp according to claim 1, further comprising a control panel for controlling operation of the light guide plate desk lamp.

4. The desk lamp according to claim 1, wherein the at least one frame has a bottom surface comprising the protrusion and a top surface opposing the bottom surface, a length of the bottom surface being greater than a length of the top surface.

5. The desk lamp according to claim 1, wherein the at least one frame includes:
    a first frame and a second frame arranged along a length direction of the light guide plate; and
    a third frame and a fourth frame arranged along width direction of the light guide plate, wherein the light guide plate is supported by the first frame, the second frame, and the third frame, and the power input module is supported by the first frame, the second frame, and the fourth frame.

6. The desk lamp according to claim 3, wherein the LED module includes a plurality of LED elements, and the power input module further includes a controller for controlling at least one among on/off and color temperature of each of the LED elements according to an operation mode selected by a user input received through the control panel.

7. The desk lamp according to claim 6, further comprising a sensing sensor for sensing at least one among a user and text, wherein the controller controls an on/off and a color temperature of each of the LED elements on the basis of a sensing result of the sensing sensor.

8. A light guide plate desk lamp comprising:
    a frame comprising a first edge, a second edge, a third edge, and a fourth edge, a length of each of the first edge and the second edge being longer than a length of each of the third edge and the fourth edge;
    a light guide plate supported by the frame, the light guide plate having a slot;
    an LED module arranged at least on one side of the light guide plate; and
    a power input module supported by the frame;
    wherein:
        the frame has a sliding groove in at least one of the first edge and the second edge for slidably coupling both the light guide plate and the power input module, the sliding groove having a protrusion configured to fit within the slot;
        the power input module being bounded by and in contact with each of the first edge, the second edge, the fourth edge, and the light guide plate; and
        an LED element of the LED module emits light as power is applied to the power input module, and the light emitted from the LED module is emitted through the light guide plate.

* * * * *